United States Patent [19]

Eimer et al.

[11] 4,305,822
[45] Dec. 15, 1981

[54] FILTER FOR SEPARATING SOLID BODIES FROM A FLUID STREAM

[75] Inventors: Klaus Eimer; Heinz Thal, both of Ratingen; Dieter Mindel, Duisburg, all of Fed. Rep. of Germany

[73] Assignee: Ludwig Taprogge Reinigungsanlagen für Röhren-Wärmeaustauscher, Düsseldorf, Fed. Rep. of Germany

[21] Appl. No.: 168,752

[22] Filed: Jul. 11, 1980

[30] Foreign Application Priority Data

Jul. 12, 1979 [DE] Fed. Rep. of Germany ....... 2928132

[51] Int. Cl.³ ............................................ B01D 35/22
[52] U.S. Cl. .................................. 210/40 S; 210/421; 210/456
[58] Field of Search ............. 210/40 S, 43 S, 420–423, 210/456

[56] References Cited

U.S. PATENT DOCUMENTS

| 3,789,992 | 2/1974 | Treplin et al. | 210/40 S |
| 3,828,930 | 8/1974 | Eimer et al. | 210/421 X |
| 3,875,063 | 4/1975 | Treplin et al. | 210/456 X |
| 4,202,777 | 5/1980 | Schall | 210/405 |

FOREIGN PATENT DOCUMENTS 2058395 3/1973 Fed. Rep. of Germany .
2225727 7/1973 Fed. Rep. of Germany .

Primary Examiner—Thomas G. Wyse
Attorney, Agent, or Firm—Karl F. Ross

[57] ABSTRACT

A filter for separating solid bodies such as fish from a stream of water utilizable as a coolant for a power-generating plant comprises a cylindrical housing, an inlet conduit attached to a cylindrical wall of the housing substantially radially thereto, a first outlet conduit connected to a bottom end of the housing for drawing off filtrate, a second outlet conduit attached to the cylindrical housing wall opposite the inlet conduit for channeling away fish-laden effluent, a filter sieve eccentrically disposed in the housing to form therewith an annular filter chamber including tapered chamber halves extending from the inlet to the second outlet conduit, and an elongate wedge-shaped fluid-guide body extending parallel to the housing symmetry axis and shiftably disposed at the junction of the housing and the inlet conduit for selectively moving into a primary position for dividing an incoming fluid stream into substantially equal portions flowing into respective chamber halves and at least into one secondary position juxtaposed to a vertical side of the inlet conduit for directing the incoming stream into one chamber half to initiate an annular flow about the sieve. The wedge has a cylindrically concave downstream surface which advantageously engages the sieve in the primary wedge position and a pair of cylindrically concave upstream surfaces which engage respective vertical sides of the inlet conduit and housing junction in respective secondary positions of the wedge.

15 Claims, 4 Drawing Figures

FILTER FOR SEPARATING SOLID BODIES FROM A FLUID STREAM

CROSS-REFERENCE TO A RELATED APPLICATION

The present application is related to our concurrently filed U.S. patent application Ser. No. 168,753.

FIELD OF THE INVENTION

Our present invention is related to a filter for separating solid objects from a fluid stream. More particularly, our present invention is related to a filter for separating bodies such as mollusk shells and fish from a stream of water to be used, for example, in cooling a power-generating plant.

BACKGROUND OF THE INVENTION

Devices for separating solid objects from a stream of water to be used in cooling a power-generating plant generally comprise a substantially cylindrical separator housing, a radially oriented inlet channel, a filtrate-outlet conduit or pipe connected to the bottom of the housing and an outlet conduit attached to a cylindrical wall of the housing for drawing off the filtered-out solid objects. A cylindrical sieve disposed in the housing forms therewith a substantially annular outer filter chamber communicating with the inlet channel and the solids-outlet conduit, while the space inside the filter sieve communicates with the filtrate-outlet pipe. A gating or valve flap is provided in the inlet channel proximate to the housing for regulating the velocity and mass flow of the incoming stream.

As described and illustrated in German patent document (Auslegeschrift) No. 2,058,395, a single valve flap is swingably mounted in the inlet channel proximate to the junction of the same and the housing for pivoting about an axis parallel to a vertically extending axis of symmetry of the filter sieve, the solids-outlet conduit being attached to the cylindrical housing wall substantially tangentially thereto and to the annular outer filter chamber. A pair of guide plates spaced from the valve flap may be rigidly fixed thereto, as shown and described in German patent document (Auslegeschrift) No. 2,225,727 for directing the incoming water stream in a tangential direction with respect to the filter sieve and for accelerating the water to a minimum velocity preferably greater than two meters per second. At inlet stream velocities less than two meters per second, the cleaning effects precipitously decrease.

Because of the tangential orientation of the solids-outlet conduit, there is a preferred direction and path of fluid flow, whereby different portions of the outer surface of the sieve cannot be equally well cleaned of adhering objects such as mussels. Furthermore, the annular motion of the incoming water stream about the filter sieve causes a whirlpool or vortex therein, this vortex leading to pressure and energy losses and yet in no way contributing to the cleaning of the sieve. To reduce these pressure losses in practice, the valve flap is generally maintained in an intermediate position and is pivoted for short intervals to effect an intermittent sieve cleaning.

In such a method of separator operation, difficulties arise if the number of solid objects in the arriving fluid stream suddenly increases, such as if a school of fish swims into the inlet conduit or a bank of mussels drops from the conduit walls. In such situations, the filter is blocked before the valve flap can be pivoted to a cleaning position.

Another disadvantage of conventional separators is the injury and killing of fish, owing to the discontinuous separator operation and to the high stream velocities involved.

OBJECTS OF THE INVENTION

An object of our present invention is to provide a filter or separator of the above-mentioned type in which pressure and energy losses are minimized.

Another object of our present invention is to provide such a filter which can effectively operate at inlet fluid-stream speeds of less than one meter per second.

Yet another object of our present invention is to provide such a filter which even in steady-state or continuous operation implements a cleaning action on the outer surface of the filter sieve.

A more particular object of our present invention is to provide a filter of the above-mentioned type which can purify water streams of large numbers of solid bodies such as fish without damaging or injuring the fish.

SUMMARY OF THE INVENTION

A filter for separating solid bodies such as fish and mollusks from a fluid stream such as flowing water comprises according to our present invention a substantially cylindrical housing, an inlet conduit, a first outlet conduit, a second outlet conduit, a filter sieve and a single rigid fluid-guide body extending parallel to the housing axis and shiftably disposed in the housing at the junction or interface thereof with the inlet conduit. The housing has a pair of end walls and a cylindrical wall, the inlet conduit and the second outlet conduit being attached to the cylindrical wall at substantially opposite sides thereof and having a substantially radial orientation with respect to the housing. The filter sieve is disposed in the housing to form an inner chamber communicating with the first outlet conduit and an outer chamber between the housing and the sieve communicating at one side with the inlet conduit and at an opposite side with the second outlet conduit; the sieve has an axis of symmetry extending parallel to the housing's symmetry axis. The rigid fluid-guide body is connected to an actuator for undergoing at least translational motion perpendicular to the housing's symmetry axis to selectively assume a first position in which the incoming fluid stream is divided into two substantially equal portions flowing into respective halves of the outer chamber toward the second outlet conduit and a second position in which the incoming fluid stream is channeled into one of said halves to form a substantially annular flow in the outer filter chamber.

The symmetrical operation of a filter or separator, according to our present invention, in which the fluid-guide body has been shifted into the first position prevents the formation of a vortex or whirlpool inside the filter sieve, thereby reducing pressure and energy losses to a minimum during normal or steady-state operation.

According to further features of our present invention, the fluid-guide body is substantially triangular or wedge-shaped in cross section and has a substantially cylindrically concave downstream surface generally facing the sieve and juxtaposable therewith in the first position of the fluid-guide body. The downstream surface of this body may have a radius of curvature approximating the radius of the housing or the radius of the sieve, preferably the latter in the case that the downstream surface of the fluid-guide body engages the sieve in the first fluid-guide position. In addition, the fluid-guide body has a pair of substantially cylindrically concave upstream surfaces joined together at a leading edge of the fluid-guide body and joined to the downstream surface thereof at respective edges. The sieve advantageously has a hole-free surface or wall facing upstream toward the inlet conduit and engaging the downstream surface of the fluid-guide body in the first or stream-dividing position thereof.

According to another feature of our present invention, the halves of the outer filter chamber each have a width decreasing from the inlet conduit in the direction of the second outlet conduit. Preferably the tapering of these chamber halves is effectuated by eccentrically disposing the sieve in the housing, the sieve axis being located between the housing symmetry axis and the second outlet conduit.

A dead-water trap is provided in the housing at the second outlet conduit, a plurality of parallel pipe sections connecting the outer chamber of the second outlet conduit and extending radially into the trap. The pipe sections partially cause the formation of eddy currents in the region of the second outlet conduit. These eddies clean the outer surface of the filter sieve during a steady-state or continuous operation of a filter or separator according to our present invention and contribute to retaining the contaminant objects in the region of the second outlet conduit. Further cleaning action during steady-state operation may be attained by shifting the fluid-guide body to an intermediate position in which the leading edge of the body is centered between lateral walls of the inlet conduit and in which the downstream surface of the body is spaced from the hole-free wall of the sieve.

It is advantageous that the inlet conduit, the housing, the dead-water trap, the sieve and the second outlet conduit have a common height, the pipe sections at the outlet being spaced from one another along the height of the trap. The preferred orientation of the filter is, then, vertical and the first outlet conduit is attached to the bottom of the housing.

Because a filter or separator according to our present invention has small pressure losses, it can be operated at low inlet water speeds, thereby minimizing injuries incurred by fish during transit thereby of the separator.

BRIEF DESCRIPTION OF THE DRAWING

These and other features of our present invention will now be described in detail, reference being made to the accompanying drawing in which.

SPECIFIC DESCRIPTION

Figure 1:
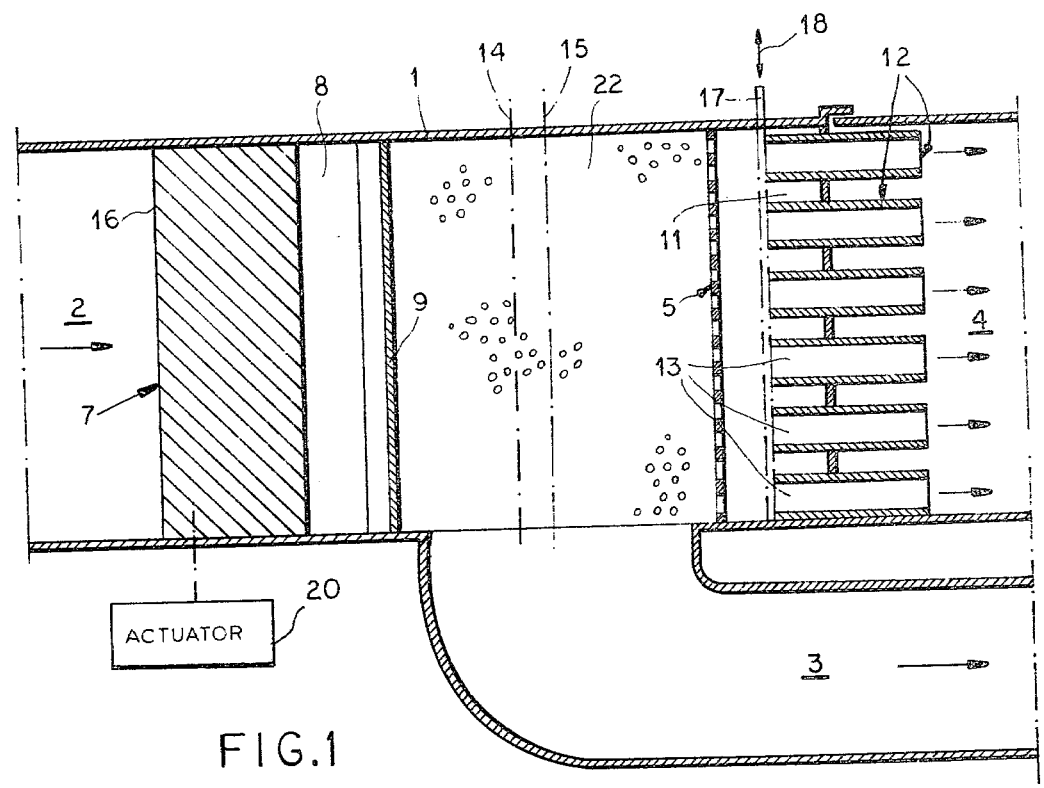
FIG. 1 is a cross-sectional view, taken along a vertical plane, of a filter according to our present invention.
Figure 2:
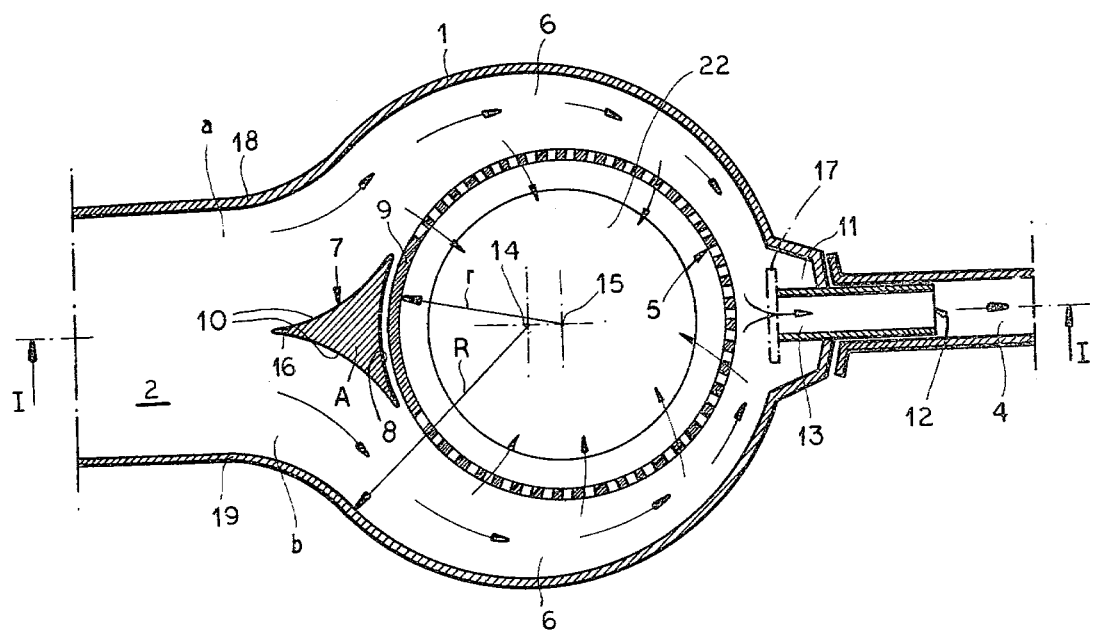
FIG. 2 is a cross-sectional view taken along line II—II in FIG. 1.

As illustrated in FIGS. 1 and 2, a filter or separator device for removing solid objects such as mollusk shells and fish from a stream of water to be used, for example, in cooling power-generating plants comprises a filter housing 1, an inlet conduit or pipe 2, a filtrate-outlet conduit or pipe 3 attached to a bottom wall of housing 1 and another outlet conduit 4 attached to a cylindrical wall of housing 1 substantially opposite inlet conduit 2, the latter outlet conduit serving to channel from housing 1 the objects filtered from the fluid stream entering the separator via feed pipe or inlet conduit 2.

A cylindrical filter sieve 5 is eccentrically disposed in housing 1 and defines therewith a substantially annular filtering chamber 6 communicating at one end with inlet conduit 2 and at an opposite end with outlet conduit or channel 4. Sieve 5 also defines a cylindrical inner space 22 communicating with filtrate-channeling pipe 3.

A water deflector or stream guide 7 substantially in the form of an elongate wedge extending parallel to symmetry axes 14 and 15 of housing 1 and sieve 5 is shiftably mounted at the interface of inlet conduit 2 and housing 1 for regulating the nature and the velocities of fluid flow in filter chamber 6, as described more fully hereinafter with reference to FIGS. 3 and 4. Stream-guide wedge 7 has a rearwardly facing or downstream surface 8 which is curved, and more particularly cylindrical with a radius of curvature substantially equal to the radius of sieve 5, and a vortex or leading edge 16 which points upstream. Surface 8 may alternatively have a radius of curvature approximately the radius of housing 1. Advantageously, forward water-deflecting or guide surfaces 10 of wedge 7 are also cylindrically concave.

Sieve 5 eccentrically disposed in housing 1, sieve symmetry axis 15 being located between housing symmetry axis 14 and outlet conduit or duct 4. Owing to the eccentric disposition of the sieve, the outer filter chamber 6 comprises a pair of chamber halves each having a width decreasing from inlet conduit 2 toward outlet duct 4, this decrease of chamber width contributing to an increase in fluid pressure in the region of the outlet duct. Sieve 5 is provided with a hole-free fluid-guide wall or surface 9 facing curved wedge surface 8 and substantially equal in length thereto. As indicated by radius arrows in FIG. 2, sieve 5 has a radius r less than curvature radius R.

Housing 1 has an extension in the region of the contaminant exit, i.e. outlet duct 4, for forming a dead-water sink or trap 11. A multiplicity of pipe sections 12 for forming a connection or bridge between chamber 6 and outlet duct 4 are inserted in the extension of housing 1 radially thereto and parallel to one another. The pipe sections have collet ends 13 projecting into trap 11 for cooperating therewith in causing the formation of eddies which serve to retain solid-matter contaminants in the exit region and to clean the outer surface of sieve 5 during a steady-state operation of the filter.

Preferably, inlet conduit 2, housing 1, sieve 5 and outlet duct 4 have a common height H, pipe sections 12 being spaced from one another along the height H of trap 11, and the filtrate outlet conduit 3 has a mouth or leading pipe section which is coaxial with sieve 5. Wedge 7 extends the entire height H of inlet conduit 2 and housing 1.

FIG. 2 shows a primary or fundamental steady-state position A of stream-guide wedge 7 in which vertex or edge 16 is centered between lateral walls of inlet conduit 2 and in which downstream surface 8 is juxtaposed to or engages sieve surface or wall 9. In this position wedge 7 divides an incoming fluid stream into two substantially equal portions a and b deflected by guide surfaces 10 into respective tapered halves of annular chamber 6. The increase in fluid pressure due at least in part to the constricting of the chamber halves forces water through the holes in sieve 5 into inner filter chamber 22, as indicated in FIG. 2 by arrows traversing the sieve. The filtrate in chamber 22 flows into conduit 5 which may be connected at an outlet end to a pump (not shown) in turn connected to a heat exchanger (not shown) at a power-generating plant. Effluent laden with solid bodies such as fish and mollusks is channeled away from the separator via pipe sections 12 and conduit 4, this conduit possibly emptying in the same reservoir (not shown) from which the incoming water stream issues.

As indicated in FIGS. 1 and 2 by dot-dash lines, a shutter or gate 17 may be slidably mounted in housing 1 (arrow 18) for blocking entrance openings to pipe sections 12 in the event that the incoming stream contains few contaminating bodies. Thus all the water of the incoming stream passes through holes in the sieve and leaves the separator via outlet conduit 3. In this case the blocking gate 17 may be periodically lifted and the deflector wedge 7 shifted in a predetermined cycle for cleaning the outside surface of sieve 5, as described in detail hereinafter.

Figure 3:
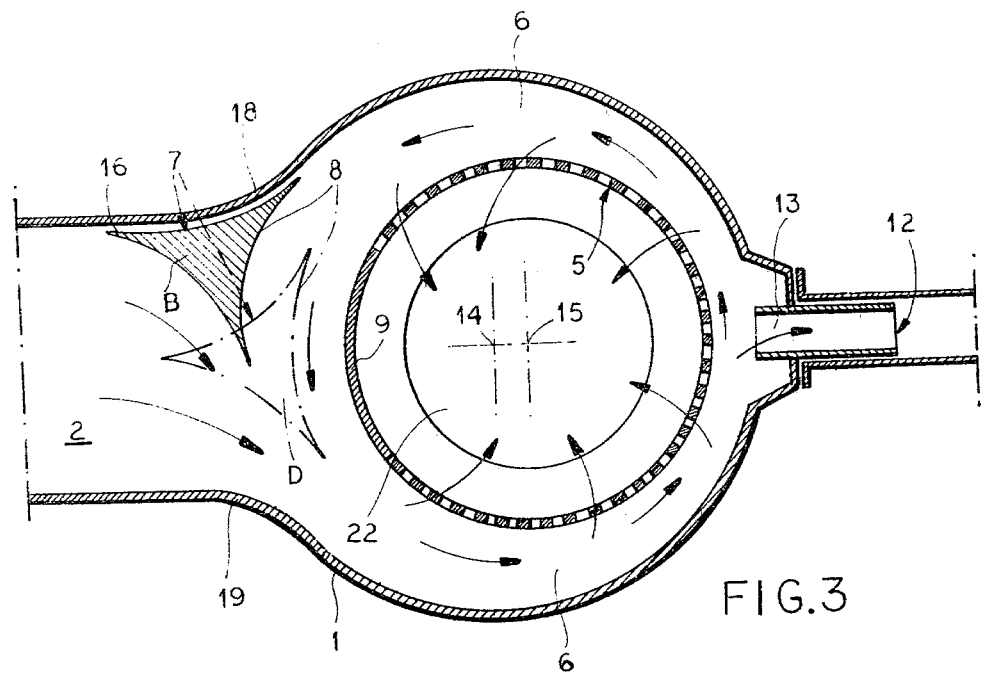
FIG. 3 is a view similar to FIG. 2, showing a different operational state of the filter.
Figure 4:
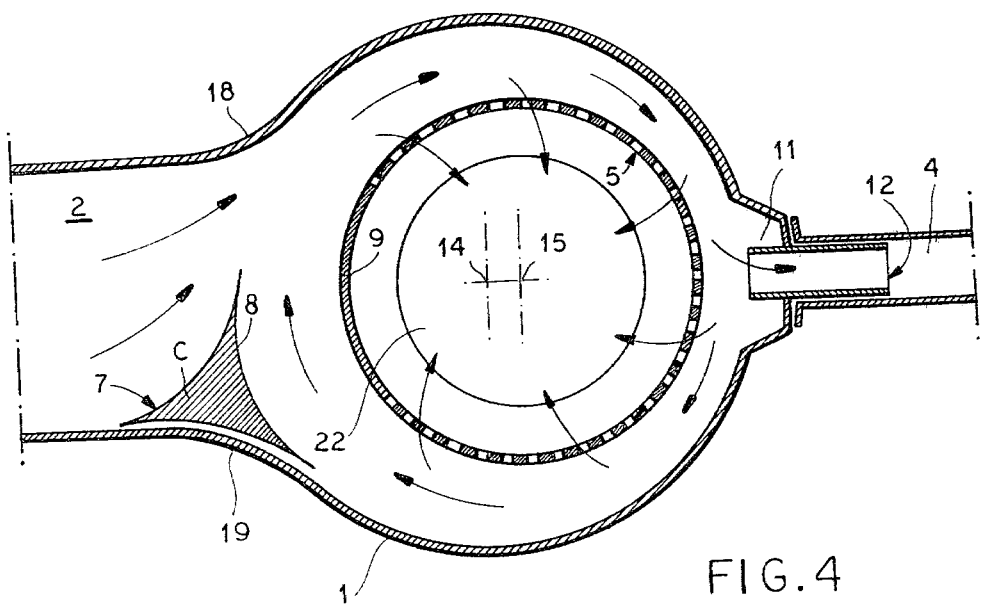
FIG. 4 is a view similar to FIGS. 2 and 3, showing yet another operational state of the filter.

As shown in dot-dash lines in FIG. 3, wedge 7 may be shifted upstream into an intermediate position D centered between the lateral walls of inlet conduit 2. In this intermediate position wedge 7 continues to divide the incoming stream into stream portions a and b which flow into respective tapered halves of outer filter chamber 6 toward dead-water trap 11 and outlet pipe sections 12. However, owing to a space between rear wedge surface 8 and hole-free sieve wall 9, a certain amount of turbulence is introduced into stream portions a and b. This turbulence aids in cleaning the outside sieve surface of debris such as mollusks clinging thereto.

A method of operating the filter or separator of FIGS. 1 and 2 to clean the outside surface of sieve 5 comprises, according to our present invention, the initial step of shifting wedge 7 into a lateral position B (FIG. 3) in which one of the forward guide surfaces 10 engages a curved vertical wall 18 (see FIG. 2) forming a junction or connection between a lateral wall of inlet conduit 2 and the cylindrical wall of housing 1. As indicated by flow arrows in FIG. 3, such a disposition of the wedge induces an annular water flow in outer filter chamber 6. Upon the establishment of the annular flow, wedge 7 is shifted into intermediate position D, thereby violently reversing the flow in at least one of the tapered halves of the outer filter chamber 6. The wedge is then moved into another lateral or secondary position C (FIG. 4) in which the other forward guide surface 10 engages another curved vertical wall 19 (see FIG. 2) joining conduit 2 to housing 1. Upon the establishment of a reversed annular flow in outer filter chamber 6, wedge 7 may be returned to the intermediate position D, thereby creating again a relatively violent turbulent flow for cleansing the outer surface of the sieve. The cycle may be repeated as often as required.

As schematically illustrated in FIG. 1, wedge 7 is connected to an actuator 20 which implements translational shifts and partial rotations of the wedge necessary to move the same into positions A-D. Actuator 20 may include a manually operated handle or, possibly, pneumatic, hydraulic, mechanical or electro-magnetic devices operating under the control of a programmer or computer having sensor inputs indicating the states of filter and power-plant parameters such as water and plant temperatures, rates of water flow and numbers of solid impurities.

We claim:
1. A filter for separating solid bodies from a fluid stream, comprising:
   a substantially cylindrical separator housing having a pair of end walls and a cylindrical wall with a first axis of symmetry;
   an inlet conduit connected to said cylindrical wall and oriented substantially radially to said housing;
   a first outlet conduit connected to an end of said housing for channeling filtered fluid therefrom;
   a second outlet conduit connected to said cylindrical wall opposite said inlet conduit and oriented substantially parallel thereto for channeling from said housing solid contaminants separated by said filter from a fluid stream fed thereto via said inlet conduit;
   a filter sieve disposed in said housing to form an inner chamber communicating with said first outlet conduit and an outer chamber between said cylindrical wall and said sieve communicating at one end with said inlet conduit and at an opposite end with said second outlet conduit, said sieve having a second axis of symmetry extending parallel to said first axis;
   a single rigid fluid-guide body extending parallel to said first axis and shiftably disposed in said housing at the junction of same and said inlet conduit for undergoing at least translational movement perpendicular to said first axis to selectively assume at least a first position in which said stream is divided into substantially equal portions flowing into respective halves of said outer chamber toward said second outlet conduit and a second position in which said stream is channeled into one of said halves to form a substantially annular flow in said outer chamber; and
   actuating means for shifting said fluid-guide body.
2. The filter defined in claim 1 wherein said fluid-guide body has a substantially triangular cross-section.
3. The filter defined in claim 2 wherein said sieve is cylindrical and said outer chamber is substantially annular, said fluid-guide body having a substantially cylindrically concave downstream surface generally facing said sieve and engageable therewith in said first position of said fluid-guide body.
4. The filter defined in claim 3 wherein said sieve has a hole-free wall facing upstream toward said inlet conduit and engaging said surface in said first position of said fluid-guide body.
5. The filter defined in claim 4 wherein said fluid-guide body has a pair of substantially cylindrically concave upstream surfaces joined together at a leading edge of said fluid-guide body and joined to said downstream surface at respective edges.
6. The filter defined in claim 5 wherein each of said chamber halves communicates at one end with said inlet conduit and at an opposite end with said second outlet conduit, said chamber halves each having a width decreasing from said inlet conduit toward said second outlet conduit.
7. The filter defined in claim 6 wherein said sieve is eccentrically disposed in said housing, said second axis being located between said first axis and said second outlet conduit.
8. The filter defined in claim 7 wherein a dead-water trap is provided in said housing at said second outlet conduit.

9. The filter defined in claim 8 further comprising at least one pipe section connecting said second outlet conduit and said outer chamber, said section projecting into said trap and being radially oriented with respect to said housing.

10. The filter defined in claim 8 wherein said inlet conduit, said housing, said sieve and said second outlet conduit have a common height, said first axis being vertical and said first outlet conduit being attached to a bottom end of said housing.

11. The filter defined in claim 10 wherein said trap extends the height of said housing, further comprising a plurality of spaced pipe sections connecting said outer chamber to said second outlet conduit, said pipe sections extending parallel to one another and into said trap.

12. The filter defined in claim 10 wherein said first outlet conduit is at least in part coaxial with said sieve.

13. The filter defined in claim 3 wherein said downstream surface has a radius of curvature substantially equal to the radius of said sieve.

14. The filter defined in claim 2 wherein said fluid-guide body has a substantially cylindrically concave downstream surface generally facing said sieve and juxtaposable thereto in said first position of said fluid-guide body.

15. The filter defined in claim 14 wherein said downstream surface has a radius of curvature between the radius of said housing and the radius of said sieve.

* * * * *